United States Patent

De Montlaur

[11] Patent Number: 5,929,003
[45] Date of Patent: Jul. 27, 1999

[54] SYNTHETIC EMULSIFIERS AND THEIR USE

[75] Inventor: George de Villardi De Montlaur, Antony, France

[73] Assignee: Exxon Chemical Patents Inc., Linden, N.J.

[21] Appl. No.: 08/945,834

[22] PCT Filed: May 1, 1996

[86] PCT No.: PCT/EP96/01822

§ 371 Date: Dec. 19, 1997

§ 102(e) Date: Dec. 19, 1997

[87] PCT Pub. No.: WO96/34682

PCT Pub. Date: Jul. 11, 1996

[30] Foreign Application Priority Data

May 5, 1995 [GB] United Kingdom .................. 9509151

[51] Int. Cl.$^6$ .................. C10M 135/10; C10M 173/00; B01F 17/12; B01J 13/00
[52] U.S. Cl. .................. 508/390; 516/25; 516/66; 516/909; 562/94
[58] Field of Search .................. 252/309, 312, 252/353; 508/390; 516/25, 66, 909; 562/94

[56] References Cited

U.S. PATENT DOCUMENTS

| 1,901,506 | 3/1933 | Günther | 252/353 X |
| 1,970,687 | 8/1934 | Brooks | 252/353 X |
| 2,388,677 | 11/1945 | Cohen | 508/390 X |
| 2,680,716 | 6/1954 | Lipkin et al. | 508/390 |
| 3,714,062 | 1/1973 | Askew et al. | 252/309 X |
| 4,089,788 | 5/1978 | McCarthy | 166/275 X |

FOREIGN PATENT DOCUMENTS

| 759480 | 5/1967 | Canada | 562/94 |
| 2297843 | 1/1976 | France . | |
| 1480032 | 7/1977 | United Kingdom . | |
| 2232665 | 12/1990 | United Kingdom . | |

*Primary Examiner*—Richard D. Lovering
*Attorney, Agent, or Firm*—Ohlandt, Greeley, Ruggiero & Perle

[57] ABSTRACT

Salts of sulphonic acids of high molecular weight with alkyl groups derived from normal olefins, preferably normal $C_3$ to $C_6$ olefins and more preferably normal butene are used as emulsifiers in oil water systems particularly in oil in water emulsions such as microemulsions and white or milky emulsions.

17 Claims, No Drawings

SYNTHETIC EMULSIFIERS AND THEIR USE

This application is a Section 371 USA National Phase Application of PCT/EP96101822, filed May 1, 1996.

The present Invention relates to the use of salts of alkyl aryl sulphonic acids as emulsifiers in oil water systems in which the alkyl group of the aryl sulphonic acid is derived from one or more normal olefines and the molecular weight of the alkyl aryl sulphonic acid is greater than 530.

The sulphonic acids may be neutralised to form sulphonates for use as an emulsifier or in oil recovery the cation will generally be an alkali metal or a quaternary nitrogenic cation.

Emulsified oils are now used in a large number of machining operations due to an industry demand for higher production rates, lower costs, improved environmental conditions and better operator acceptance. Emulsions are generally used where cooling is more important than lubrication. In operations such as broaching, deep drilling, or where surface finish is particularly critical, neat oils may still be used, but the development of extreme pressure additives in emulsions has increased their applicability and use.

The emulsions are generally prepared from emulsifiable oils supplied to the final user for incorporation into the water. The emulsifiable oils frequently contain additives which can be supplied as an additive package, formulation or concentrate to the producer of the emulsifiable cutting oil.

Amongst the various types of fluids, there is a marked trend towards those having an optimised combination of lubricating, cooling and long-life properties. Such fluids are obtained by micro-emulsification of a base oil formulated with anti-corrosion and biostability agents. The micro-emulsion type of cutting fluid has good stability due to the very small size of their hydrocarbon droplets which do not tend to coalesce during storage. This feature is a key advantage over conventional fluids forming white emulsion whose hydrocarbon droplet size is much larger, where formulation with water-soluble biostability agents is difficult.

Aqueous metal working fluids have been known for many years and different additives have been developed to provide oils useful for different types of metal working and for use with different types of water.

Various emulsifiers have been proposed for the production of water in oil and oil in water emulsions. Typical emulsifiers are the sulphonates, such as the natural and synthetic petroleum sulphonates and the synthetic alkyl aryl sulphonates, such as the $C_{12}$–$C_{24}$ alkyl benzene and toluene sulphonates and mixtures thereof as described in United Kingdom patent specification 1476891. These sulphonates are typically derived from sulphonic acids which have average molecular weights of 530 or less.

The aqueous metal working fluids may be water in oil emulsions or oil in water emulsions, largely depending upon whether lubrication or cooling is the more important. We are, however, particularly concerned with the currently more popular oil in water emulsion cutting fluids such as micro-emulsions and white or milky emulsions.

The additives may be supplied to a producer of emulsifiable oils or to the producer of the aqueous fluids. In either instance they may be supplied as a solution or an emulsion of the sulphonates together with other additives for incorporation into oil or the bulk of the water. The solution may be in oil or water and if in oil it will generally contain some water.

The emulsifiable oil supplied to the final user may contain other emulsifiers to enable the production of oil in water or water in oil emulsions and, the choice depending upon the nature of the oil and the type of emulsion required. Alternatively the final user may introduce the emulsifier into the fluid separately. Salts of the synthetic alkyl benzene sulphonic acids, particularly the mixtures which-form the subject of United Kingdom Patent No. 1476891 are our preferred co-emulsifier, other suitable emulsifiers are the sulphonamide carboxylates such as those described in French Patent 2403396 and the sulphonates described in European Patent Application 0015491.

We have found that by using sulphonic acids of high molecular weight with alkyl groups derived from normal olefines, preferably normal $C_3$ to $C_6$ olefines and more preferably normal butene, the performance of the salts as emulsifiers is significantly improved compared to conventional alkyl aryl sulphonate emulsifiers which are based on sulphonic acids of low molecular weight with alkyl groups derived from branched olefines and of thus enabling comparable emulsions to be obtained using a smaller amount of emulsifier. Whereas when using a conventional emulsifier 11 mass % or more has typically been required for the production of stable emulsions we have found that emulsions of comparable stability may be obtained using less than 11 mass % and surprisingly even at less than 5 mass % of emulsifier according to this invention. The alkyl aryl sulphonic acids used to prepare the emulsifiers of the present invention have an average molecular weight of greater than 530, preferably 630 or greater and most preferably 660 or greater. It is preferred that the average molecular weight is in the range of 530 to 1200 and most preferably in the range 630 to 1200.

We therefore prefer that the emulsifiable cutting oil for incorporation into bulk water contains from 2to 80 wt %, preferably 3 to 25 wt %, and more preferably 7 to 20 wt % of the emulsifier. The emulsifiable cutting oil may be incorporated into bulk water at 2 to 30 mass % preferably 2 to 20 mass %.

Where fluids are to be used for metal working they may be boron free although small amounts of boron may be required for the necessary anti-bacterial properties. Boron may be provided by incorporating boric acid or any other boron compound that forms boric acid upon being dissolved in water, such as metaboric acid or boric oxide. It is believed that the boric acid forms an addition product or salt with the amine which is a syrupy liquid and does not precipitate out of the cutting fluid. The emulsifiable oil may contain up to 30 wt % boric acid although we prefer that it contains from 2 to 6 wt % of boric acid to give no more than 1.0, preferably no more than 0.4 wt % boron in the final aqueous metal working fluid.

Other additives which may be present include hydroxy di- or tri-carboxylic acids which may be used are tartaric and citric acids. It is important that the acid used be soluble in water.

Alkanolamines used in the present invention may also be present in cutting oil formulations using the sulphonates of the present invention, typically those which contain from one to three aliphatic radicals, each containing from one to four carbon atoms, and have at least one hydroxy group attached to a carbon atom, and include primary, secondary and tertiary alkylol amines such as mono-di- or triethanolamine. We prefer that both the emulsifiable oil and the aqueous fluid contain an excess of alkanolamine relative to total acid content.

A coupling agent such as a non-ionic wetting agent is generally used in aqueous metal working fluids embodying the invention. To improve the compatibility of the components, any desired non-ionic wetting agent may be used, such as a condensation product of ethylene oxide, a condensation product of a fatty acid or derivative, such as a derivative of a fatty acid, fatty alcohols, fatty amide or fatty amine, with ethylene oxides and a reaction product obtained by the condensation of an oxyalkylaryl compound, such as a derivative of an alkylphenol or alkylnaphthol, with ethylene oxide. It is preferable that the non-ionic wetting agent employed be water-soluble. Typical non-ionic wetting agents include the polyethoxyesters of fatty acids, the monooleate of a polyethylene glycol, the monolaurate of a polyethylene glycol, the polyethoxyethers of fatty alcohols, the condensation product of an alkylphenol such as dodecyl phenol with 12 moles of ethylene oxide, and the sulfonated product of the condensation of an alkylphenol or an alkylnaphthyl with ethylene oxide.

A particularly useful non-ionic wetting agent is an alkyl phenoxy polyethyoxy ethanol such as octyl or nonyl phenoxy polyethoxy ethanol.

We also find, particularly when emulsifiers other than sulphonic acids and sulphonates are used that carboxylic acids such as neo acids and fatty acids such as tall oil fatty acid may be included to enhance emulsion production.

Other ingredients which may be incorporated in the aqueous fluids include silicone and/or silicone free antifoaming agents and biocides.

Neutral sodium sulphonates obtained from these sulphonic acids were used as emulsifiers for cutting oils. The cutting oils are obtained by blending the sodium sulphonate with or without a co-emulsifier, with a coupling agent and by blending the mixture with a base oil. Other co-additives can be introduced to the cutting oil include: corrosion inhibitors, white/yellow metal passivators, defoamers, extreme-pressure, antiwear or lubricity agents, biocides or biostatic agents, additives yielding alkalinity reserve.

Emulsions were prepared to compare the stability of emulsions according to the present invention and those using conventional emulsifiers. The target was to determine the minimum amount of sodium sulphonate required to produce a stable translucent micro emulsion. The results were as follows:

| Mass % | Comparative Example | Example 1 |
|---|---|---|
| Anti-corrosion additive* | 44.7 | 45.0 |
| Water | 30.5 | 37.3 |
| Tall Oil Fatty Acid | 1.8 | 2.0 |
| Butyldiglycol | 4.2 | 2.0 |
| Sodium Salt of (polynormalbutyl)benzene sulphonic acid.** | — | 4.7 |
| Mixed alkyl benzene sulphonic acid of average molecular weight of 530.** | 11.3 | — |
| 90 Neutral Oil | 7.5 | 9.1 |

*The anti-corrosion additive is a proprietary additive package comprising boric acid, alkanolamine, hydroxy carboxylic acid and water.
**Both of the emulsifiers were used as approximately 60% active ingredient solutions in oil.

The results in the table clearly show that the emulsifier derived from polynormalbutyl benzene sulphonic acid is able to provide a stable microemulsion at less than half the concentration of a conventional emulsifier. Furthermore it is able to do this with a larger amount of oil and with the use of significantly lower levels of butyidiglycol coupling agent compared to the conventional emulsifier.

We claim:

1. An emulsifier for cutting oils which comprises a salt of an alkaryl sulphonic acid wherein the alkyl of the alkaryl group is derived from at least one $C_4$ to $C_6$ normal olefin and the average molecular weight of the acid is greater than 530.

2. The emulsifier according to claim 1 wherein said olefin is normal butene.

3. The emulsifier according to claim 1 wherein said average molecular weight of said acid is about 630 or greater.

4. The emulsifier according to claim 3 wherein said average molecular weight of said acid is about 660 or greater.

5. The emulsifier according to claim 3 wherein said average molecular weight of said acid is between about 630 to 1200.

6. A cutting fluid which comprises:
   a base oil; and
   an emulsifier comprising a salt of an alkaryl sulphonic acid wherein the alkyl of the alkaryl group is derived from at least one $C_4$ to C6 normal olefin and the average molecular weight of the acid is greater than 530.

7. The cutting fluid according to claim 6 wherein said emulsifier is present in said cutting fluid in amount between about 0.2 to 80 wt. %.

8. The cutting fluid according to claim 7 wherein said emulsifier is present in said cutting fluid in amount between about 3 to 25 wt. %.

9. The cutting fluid according to claim 8 wherein said emulsifier is present in said cutting fluid in amount between about 7 to 20 wt. %.

10. The cutting fluid according to claim 6 wherein said emulsifier is present in said cutting fluid in an amount of less than 5 mass %.

11. The cutting fluid according to claim 6 wherein said olefin is normal butene.

12. The cutting fluid according to claim 6 wherein said average molecular weight of said acid is about 630 or greater.

13. The cutting fluid according to claim 12 wherein said average molecular weight of said acid is about 660 or greater.

14. The cutting fluid according to claim 12 wherein said average molecular weight of said acid is between about 630 to 1200.

15. The cutting fluid according to claim 6 further comprising at least one additive selected from the group consisting of: coupling agents, corrosion inhibitors, metal passivators, defoamers, extreme-pressure agents, antiwear or lubricity agents, biocides or biostatic agents, and additives yielding alkalinity reserve.

16. An oil-in-water emulsion formed from the cutting fluid of claim 6.

17. The oil-in-water or water-in-oil emulsion according to claim 16 wherein said cutting fluid is present in an amount between about 2 to 30 mass %.

* * * * *